(12) United States Patent
Crabtree et al.

(10) Patent No.: US 11,636,549 B2
(45) Date of Patent: *Apr. 25, 2023

(54) CYBERSECURITY PROFILE GENERATED USING A SIMULATION ENGINE

(71) Applicant: QOMPLX, Inc., Tysons, VA (US)

(72) Inventors: Jason Crabtree, Vienna, VA (US); Andrew Sellers, Monument, CO (US); Raveem Ismail, Oxford (GB); Anant Borole, Dona Paula (IN); Bharat Amin, Farnham (GB)

(73) Assignee: QOMPLX, INC., Tysons, VA (US)

( * ) Notice: Subject to any disclaimer, the term of this patent is extended or adjusted under 35 U.S.C. 154(b) by 245 days.

This patent is subject to a terminal disclaimer.

(21) Appl. No.: 17/085,871

(22) Filed: Oct. 30, 2020

(65) Prior Publication Data

US 2021/0174452 A1 Jun. 10, 2021

Related U.S. Application Data

(63) Continuation of application No. 15/678,089, filed on Aug. 15, 2017, now Pat. No. 10,853,883, which is a continuation of application No. 15/343,209, filed on Nov. 4, 2016, now Pat. No. 11,087,403, which is a continuation-in-part of application No. 15/229,476, filed on Aug. 5, 2016, now Pat. No. 10,454,791, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, which is a continuation-in-part of application No. 15/141,752, filed on Apr. 28, 2016, now Pat. No. 10,860,962, (Continued)

(51) Int. Cl.
*G06Q 40/00* (2012.01)
*G06Q 40/08* (2012.01)
*G06N 5/022* (2023.01)
*G06Q 30/0202* (2023.01)

(52) U.S. Cl.
CPC ............. *G06Q 40/08* (2013.01); *G06N 5/022* (2013.01); *G06Q 30/0202* (2013.01)

(58) Field of Classification Search
CPC ..... G06Q 40/08; G06Q 30/0202; G06N 5/022
USPC .......................................................... 705/4
See application file for complete search history.

(56) References Cited

U.S. PATENT DOCUMENTS 7,325,252 B2 * 1/2008 Bunker, V .............. H04L 43/00
726/25
8,156,029 B2 4/2012 Szydlo
(Continued)

FOREIGN PATENT DOCUMENTS

WO 2015094545 A1 6/2015

*Primary Examiner* — Hai Tran
(74) *Attorney, Agent, or Firm* — Galvin Patent Law LLC; Brian R. Galvin (57) ABSTRACT

A system for generating a cybersecurity profile, wherein a time series data retrieval and storage server retrieves information from a prospective client, and information previously gathered, and stored, from a plurality of sources; a directed computational graph analysis module performs graph analysis on the data from the time series data retrieval and storage server; and an automated planning service module performs predictive simulation analysis on data received from the directed computational graph.

10 Claims, 8 Drawing Sheets

Related U.S. Application Data which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, application No. 17/085,871 is a continuation of application No. 15/678,089, filed on Aug. 15, 2017, now Pat. No. 10,853,883, which is a continuation-in-part of application No. 15/343,209, filed on Nov. 4, 2016, now Pat. No. 11,087,403, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned.

(56) References Cited

U.S. PATENT DOCUMENTS

| | | |
|---|---|---|
| 8,352,347 B2 | 1/2013 | Howard et al. |
| 8,881,288 B1 * | 11/2014 | Levy .................... G06F 21/577 709/225 |
| 2007/0168370 A1 | 7/2007 | Hardy |
| 2016/0171415 A1 * | 6/2016 | Yampolskiy ........ H04L 63/1425 705/7.28 |
| 2016/0205126 A1 | 7/2016 | Boyer et al. |

* cited by examiner

CYBERSECURITY PROFILE GENERATED USING A SIMULATION ENGINE

CROSS-REFERENCE TO RELATED APPLICATIONS

| application No. | Date Filed | Title |
|---|---|---|
| Current application | Herewith | SYSTEM FOR FULLY INTEGRATED CAPTURE, AND ANALYSIS OF BUSINESS INFORMATION RESULTING IN PREDICTIVE DECISION MAKING AND SIMULATION Is a continuation of: |
| 15/678,089 | Aug. 15, 2017 | CYBERSECURITY PROFILE GENERATED USING A SIMULATION ENGINE which is a continuation-in-part of: |
| 15/343,209 | Nov. 4, 2016 | RISK QUANTIFICATION FOR INSURANCE PROCESS MANAGEMENT EMPLOYING AN ADVANCED DECISION PLATFORM which is a continuation-in-part of: |
| 15/229,476 U.S. Pat. No. 10,454,791 | Aug. 5, 2016 Issue Date Oct. 22, 2019 | HIGHLY SCALABLE DISTRIBUTED CONNECTION INTERFACE FOR DATA CAPTURE FROM MULTIPLE NETWORK SERVICE SOURCES which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION which is a continuation-in-part of: |
| 15/091,563 U. S. Pat. No. 10,204,147 | Apr. 5, 2016 Issue Date Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES which is a continuation-in-part of: |
| 14/986,536 U.S. Pat. No. 10,210,255 | Dec. 31, 2020 Issue Date Feb. 19, 2019 | DISTRIBUTED SYSTEM FOR LARGE VOLUME DEEP WEB DATA EXTRACTION which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | SYSTEM FOR FULLY INTEGRATED CAPTURE, AND ANALYSIS OF BUSINESS INFORMATION RESULTING IN PREDICTIVE DECISION MAKING AND SIMULATION Is a continuation of: |
| 15/678,089 | Aug. 15, 2017 | CYBERSECURITY PROFILE GENERATED USING A SIMULATION ENGINE which is a continuation-in-part of: |
| 15/343,209 | Nov. 4, 2016 | RISK QUANTIFICATION FOR INSURANCE PROCESS MANAGEMENT EMPLOYING AN ADVANCED DECISION PLATFORM which is a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE | the entire specification of each of which is incorporated herein by reference.

BACKGROUND OF THE INVENTION

Field of the Invention

The disclosure relates to the field of insurance, particularly cyber insurance.

Discussion of the State of the Art

Insurance has traditionally been about insurance companies protecting its members. In recent trends, insurance has become more about providing a "one-size-fits-all" approach to avoiding risk outright. While on the surface this may seem appealing, this practice may prove costly to clients due to overprotection, especially if the overprotection encompasses parts of the client's business that may not be all that crucial or vital. Additionally, the standard models presently in use by insurance providers may be too reductive to adequately model risk for the clients.

Another issue that has developed recently, relative to the history of insurance, is the issue of insuring digital assets. As technological advances are made, more and more businesses as of certain industries are moving their business, and/or data online, where there may be increased exposure, and increased risk of hacking attacks. Additionally, with the rapid rate in which exploits are discovered, and hacking tools released, current insurance solutions are not keeping up, thus leaving clients at risk. In 2013 to 2014 alone, there were several major cybersecurity events that occurred where the companies that were victims had cybersecurity budget of in the hundreds of millions of dollars.

What is needed is an insurance solution that gathers information about a prospective client's digital assets, as well as run a security audit on the prospective client's systems. Such a system must then use the garnered data to generate data sets to aid in determining likelihood of assets being targeted, threat actors, steps to strengthen security in the prospective client's systems through the use of simulations and continuously updated models, and determining appropriate insurance premiums that are beneficial to all parties involves.

SUMMARY OF THE INVENTION

Accordingly, the inventor has developed a system for generating unique cybersecurity for each prospective client. In a typical embodiment, the prospective client provides information pertaining to their business, and also a snapshot of their digital assets and networking systems through use of a provided software utility. The information is then combined with historical data gathered from other sources and businesses, and analyzed using models and simulations with a business operating system. The result of the analysis is a profile that conveys the unique needs of the prospective client, thus aiding the insurance provider in providing the best tradeoff of coverage and system security with premium costs to prospective clients.

According to a preferred embodiment, a system for generating a cybersecurity profile is provided, comprising a time series data retrieval and storage server comprising a memory, a processor, and a plurality of programming instructions stored in the memory thereof and operable on the processor thereof, wherein the programmable instructions, when operating on the processor, cause the processor to receive new information provided by a prospective client, and retrieve stored information that was previously gathered from a plurality of sources; a directed computational graph analysis module comprising a memory, a processor, and a plurality of programming instructions stored in the memory thereof and operable on the processor thereof, wherein the programmable instructions, when operating on the processor, cause the processor to retrieve a plurality of data from the time series data retrieval and storage module, and analyze at least a portion of the retrieved data for likelihood of various cyberattack occurrences along with likely culprits for each incident; and an automated planning service module comprising a memory, a processor, and a plurality of programming instructions stored in the memory thereof and operable on the processor thereof, wherein the programmable instructions, when operating on the processor, cause the processor to receive data and metadata from the directed computational graph analysis module, and perform predictive simulation analysis on the received data.

According to another embodiment, at least a portion of the information provided by the prospective client pertains to the prospective client's systems configurations, system layout, and digital assets. According to another embodiment, at least a portion of the information provided by the prospective client pertains to the prospective client's industry of business. According to another embodiment, at least a portion of the information used for profile generation is data previously gathered and previously analyzed from other clients.

According to another embodiment, the system further comprises a web crawler module that continuously monitors sources for release and development of new cybersecurity threats. According to another embodiment, at least a portion of the information gathered by the web crawler module is included in the process of generating the cybersecurity profiles. According to another embodiment, at least a portion of the information gathered by the web crawler module is used to protect a client's systems from new and unknown threats.

According to another aspect of the invention, a method for generating a cybersecurity profile is provided comprising the steps: (a) receiving new information from a prospective client using a data retrieval and storage server; (b) retrieving stored information that was previously gathered from a plurality of sources using the data retrieval and storage module; (c) retrieving a plurality of data from the time series data retrieval and storage module using a directed computational graph analysis module; (d) analyzing at least a portion of the retrieved data for likelihood of various incident occurrences along with likely culprits for each incident using the directed computational graph analysis module; (e) receiving data and metadata for predictive simulation analysis from the directed computational graph analysis module using an automated planning service module; and (f) performing predictive simulation transformations on data received from the other modules using the automated planning service module.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

The inventor has conceived, and reduced to practice, the generation and usage of unique profiles for prospective clients which will aid in quantifying risk, likelihood of cyberattacks, and possible threat actors for each sector of the prospective client's digital assets, and networking systems.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB 08/13/1965" and "speaks English". Similar to the use of properties to further describe the information in a node, a relationship between two nodes that forms an edge can be qualified using a "label". Thus, given a second node "Thomas G," an edge between lames R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected". Under circumstances when a relationship flows from one node to another in one direction, for example James R is "taller" than Thomas G, the order of the endpoints is significant. Graphs with such edges are designated as "directed". In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention.

As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as a example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Conceptual Architecture

Figure 1:
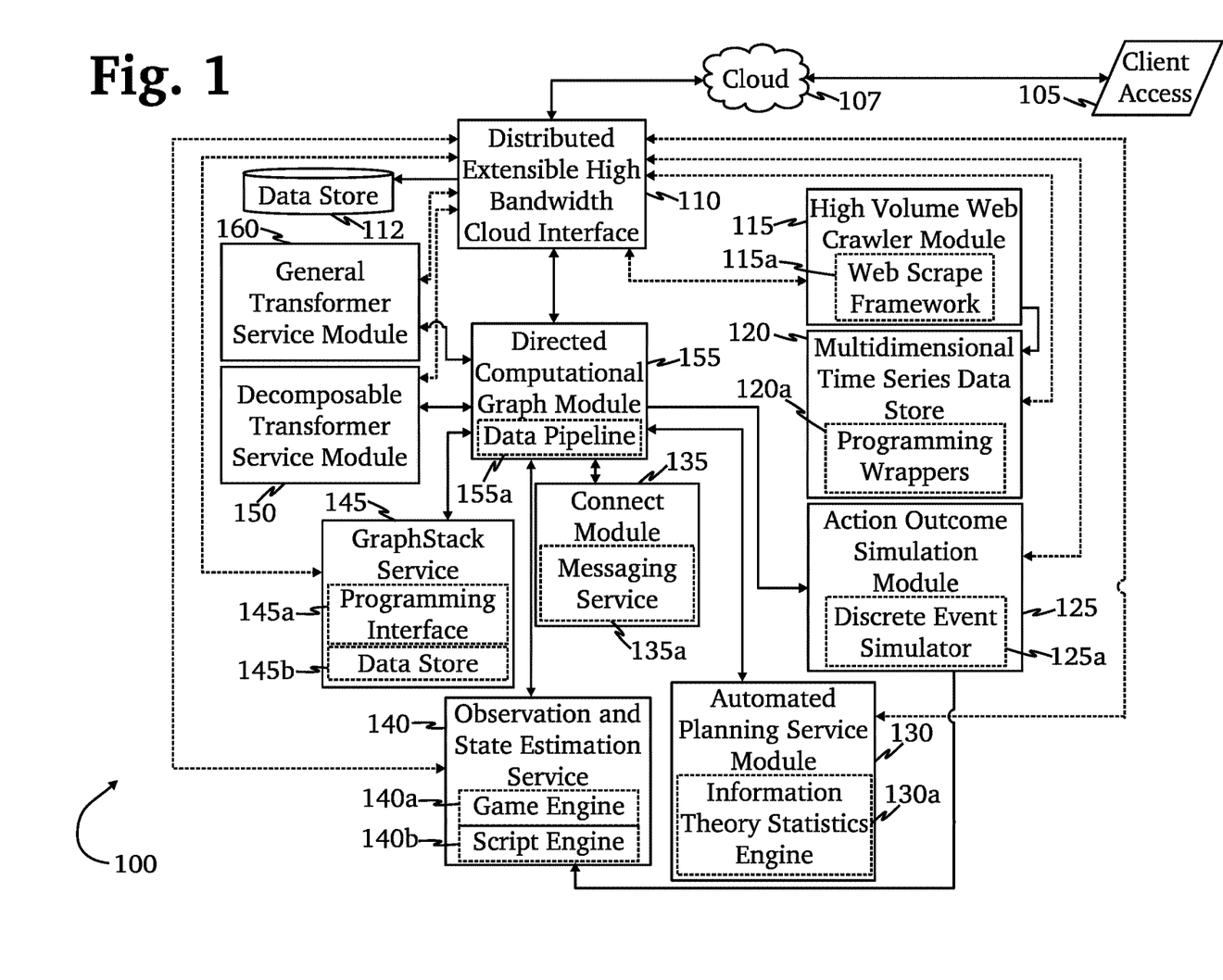
FIG. 1 is a diagram of an exemplary architecture of a business operating system according to an embodiment of the invention.

FIG. 1 is a diagram of an exemplary architecture of a business operating system 100 according to an embodiment of the invention. Client access to system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and a graph stack service 145. Directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within directed computational graph module 155, data may be split into two identical streams in a specialized pre-programmed data pipeline 155a, wherein one sub-stream may be sent for batch processing and storage while the other sub-stream may be reformatted for transformation pipeline analysis. The data may be then transferred to a general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High-volume web crawling module 115 may use multiple server hosted preprogrammed web spiders which, while autonomously configured, may be deployed within a web scraping framework 115a of which SCRAPY™ is an example, to identify and retrieve data of interest from web based sources that are not well tagged by conventional web crawling technology. Multiple dimension time series data store module 120 may receive streaming data from a large plurality of sensors that may be of several different types. Multiple dimension time series data store module 120 may also store any time series data encountered by system 100 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 120 may accommodate irregular and high-volume surges by dynamically allotting network bandwidth and server processing channels to process the incoming data. Inclusion of programming wrappers for languages—examples of which may include, but are not limited to, C++, PERL, PYTHON, and ERLANG™—allows sophisticated programming logic to be added to default functions of multidimensional time series database 120 without intimate knowledge of the core programming, greatly extending breadth of function. Data retrieved by multidimensional time series database 120 and high volume web crawling module 115 may be further analyzed and transformed into task-optimized results by directed computational graph 155 and associated general transformer service 150 and decomposable transformer service 160 modules. Alternately, data from the multidimensional time series database and high-volume web crawling modules may be sent, often with scripted cuing information determining important vertices 145a, to graph stack service module 145 which, employing standardized protocols for converting streams of information into graph representations of that data, for example open graph internet technology (although the invention is not reliant on any one standard). Through the steps, graph stack service module 145 represents data in graphical form influenced by any pre-determined scripted modifications 145a and stores it in a graph-based data store 145b such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 130, which also runs powerful information theory-based predictive statistics functions and machine learning algorithms 130a to allow future trends and outcomes to be rapidly forecast based upon the current system derived results and choosing each a plurality of possible business decisions. Then, using all or most available data, automated planning service module 130 may propose business decisions most likely to result in favorable business outcomes with a usably high level of certainty. Closely related to the automated planning service module 130 in the use of system-derived results in conjunction with possible externally supplied additional information in the assistance of end user business decision making, action outcome simulation module 125 with a discrete event simulator programming module 125a coupled with an end user-facing observation and state estimation service 140, which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

For example, an insurance company using business operating system 100 may have caught the interest of a prospective client. The prospective client accesses a web portal on cloud interface 107 of system 100, where the prospective client may access a sign-up form. The sign-up form may then instruct the prospective client to download and execute software from the insurance provider to the prospective client's own systems to gather additional, real-time data from the prospective client's systems by multidimensional time series and data store 120 programmed to process such data 120a. The newly gathered data, from both the sign-up form and system scan, may then be combined with previously gathered data from other similar businesses, as well as news and trends regarding cybersecurity gathered and stored by web crawler 115. Graphical analysis 155, 145 is performed on the gathered data, and a set of unique cybersecurity profiles are generated for the prospective client. The profiles provide insight for the insurance provider to determine a best approach to cater to the prospective client's specific needs in cybersecurity, as well as determine an appropriate premium for the prospective client.

Figure 2:
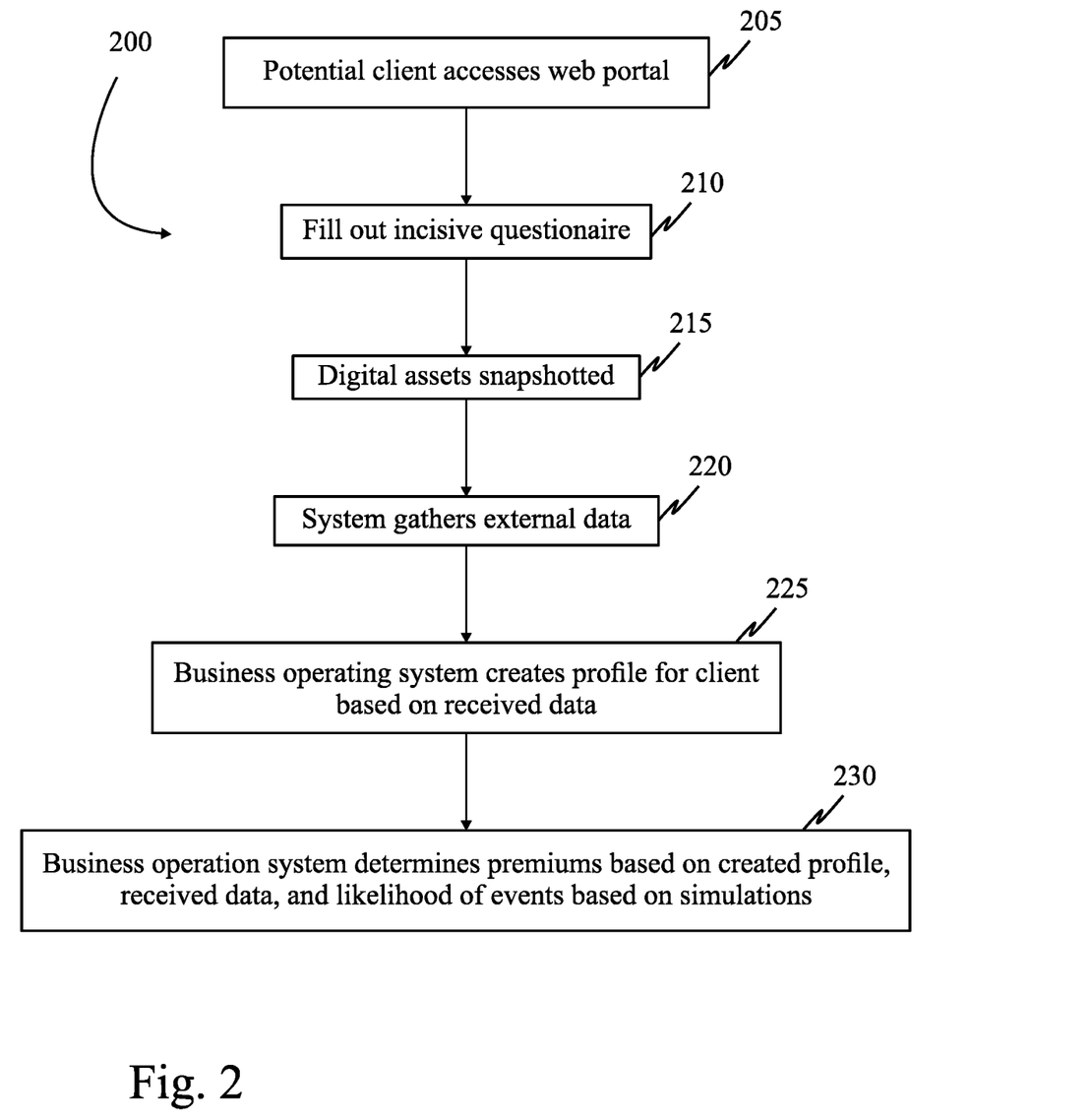
FIG. 2 is a flow diagram illustrating a method in which a prospective client may sign up for service according to various embodiments of the invention.

FIG. 2 is a flow diagram illustrating a method 200 according to which a prospective client may sign up with an insurer according to various embodiments of the invention. The prospective client first accesses a web portal on a website hosted by the insurance provider in step 205. The web portal may also provide the prospective client with other details, such as, but not limited to, services provided, frequently asked questions, details on how the insurance works, contact information, and the like. Once the prospective client is ready to sign up, they may access a questionnaire on web portal in step 210. The questionnaire may intelligently auto-fill certain fields of the questionnaire as information is entered by a user or gathered from the prospective client's computer or network, such as a browser plugin or a downloadable executable. The information may include, without limitation, the prospective client's industry, number of employees, organization of the business, online presence, and the like. Following the questionnaire, the prospective client may execute an insurer-provided software on his own system in step 215. The software may take a snapshot of the prospective client's digital assets which may include, but not are limited to, baseline network usage data, publicly facing computers, presently running software and services, patch versions of running software and services, and the like. The structure and layout of the prospective client's network may also be snapshotted. After the software completes its snapshotting, the insurer's system may obtain additional information from external sources in step 220. External sources of information may include, but are not limited to, current trends in exploits and cyberattack targets, expert opinions, information previous gathered and analyzed from other similar businesses, and the like. After the prospective client-provided data and external data has been combined and analyzed, a profile may be created for client in step 225. The profile may comprise a propensity to be attacked (PTBA) profile, and a threat profile. The profiles themselves and creation of the profiles are further explained in FIG. 3. Taking into consideration the previously completed steps, the insurer's systems may determine a premium for the prospective client in step 230, as well as steps that the prospective client may take to immediately strengthen their cybersecurity. Items that may have an effect on the premium may include, but are not limited to, a service tier, the resources devoted and intensity in which protection must be applied to the prospective client's systems, predicted frequency of cyberattacks based on models and simulations, costs incurred by loss events or successful breaches, and the like.

It should be understood that FIG. 2 is an illustration of a method that may be used in several embodiments of the invention, and does not represent the only way for a potential client to sign up for cyber insurance. For example, in some embodiments, a potential client may meet with an underwriter in person to sign up, and the underwriter may personally perform the auditing of the prospective client's systems.

Figure 3:
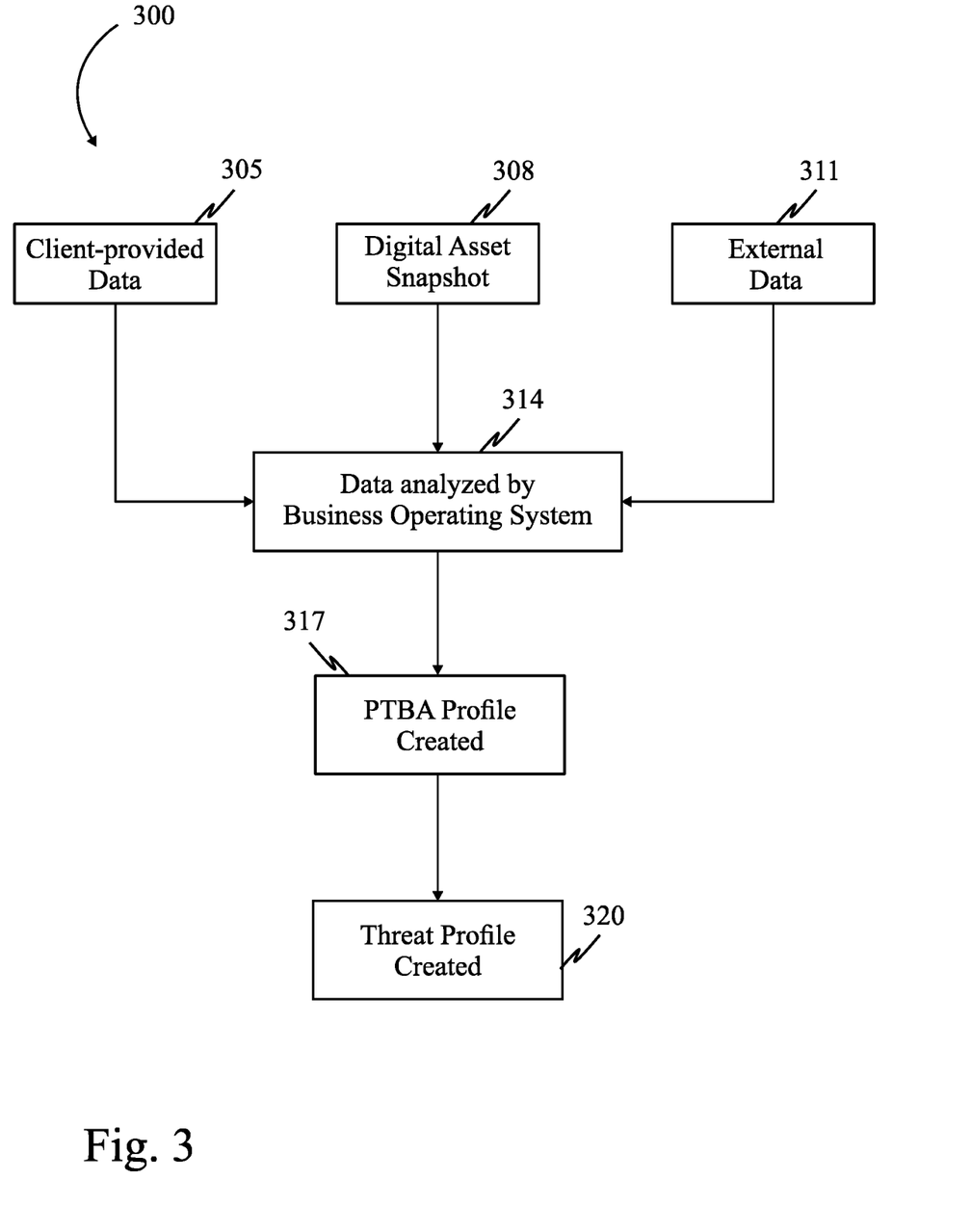
FIG. 3 is a flow diagram illustrating a method in which the business operating system computes and generates a unique cybersecurity profile for clients according to various embodiments of the invention.

FIG. 3 is a flow diagram illustrating a method 300 according to which business operating system 100 computes and generates unique cyber security profiles for prospective clients according to various embodiments of the invention. First, data from various sources may be provided to the business operating system for analysis. This data may comprise, but is not limited to, client-provided data collected in step 305, snapshots of a client's digital assets collected in step 308, and external information gathered by various functions of the business operating system in step 311. Client-provided data may include, but is not limited to, the industry with which the business is associated, the business's organizational structure, the degree of security proactivity, and the like. Digital asset snapshot, may include, but is not limited to, baseline network usage data, publicly facing computers, running software and services, patch versions of running software and services, and the like. External data may include, but is not limited to, current trends in exploits and cyberattack targets gathered by the business operating from the common web and from deep and dark web, security expert opinions, information previously gathered and analyzed from other similar businesses, and the like. After the data has been gathered, the data may be analyzed via various functions business operating system 100 in step 314 using models and simulations. The analysis results in generation of a PTBA profile in step 317. Combined with the PTBA profile and other information pertaining to the prospective client such as, but not limited to, event sets, network models, and network distributions, a threat profile may be created in step 320.

The PTBA profile takes into consideration such things as the prospective client's industry of business, for example a hospital or a bank; the prospective client's digital assets, for example customer information or financial assets; and threat actors along with the likelihood to be attacked by each threat actor, for example disgruntled employees or hacker. Combined with historical data, and newly acquired data on developing trends, the PTBA profile aids in the underwriting process with precise ideas pertaining to cybersecurity risks, data assets, attackers, and data protection resilience.

The threat profile may combine the PTBA profile with other various data points mentioned above and may calculate, through use of models and simulations, the frequency and severity of successful breaches that may trigger loss events for the prospective client. This may aid not only the underwriter by giving them a better sense in premium pricing, but also the potential customer by providing recommendations and steps on how to immediately further secure their network or digital assets, such as applying a patch for outdated software.

Figure 4:
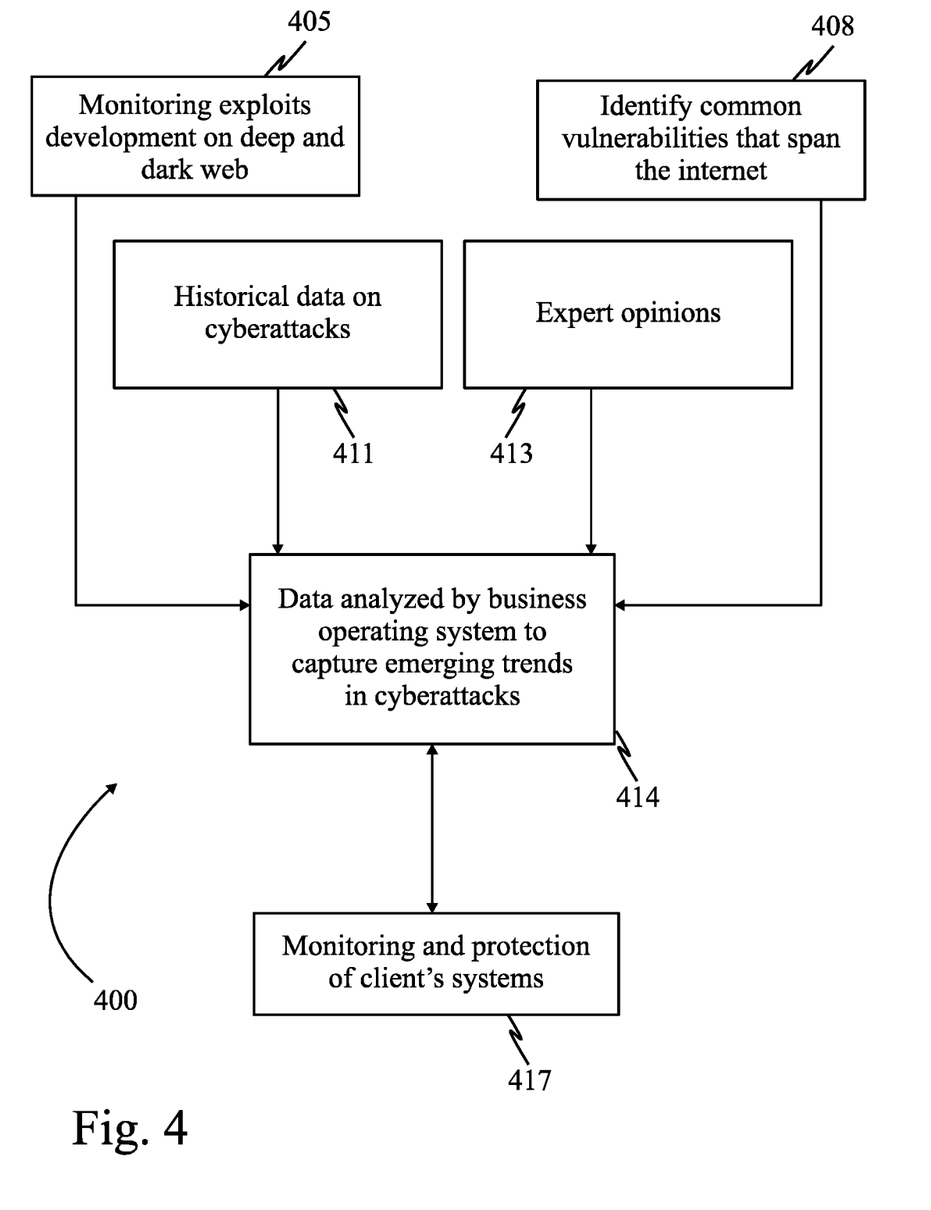
FIG. 4 is a flow diagram illustrating a method in which the business operating system discovers and learns of new trends, vulnerabilities, and exploits and using that data to predict and mitigate cyberattacks utilizing cutting edge exploits according to various embodiments of the invention.

FIG. 4 is a flow diagram illustrating a method 400 in which business operating system 100 discovers and learns of new trends, vulnerabilities, and exploits. The information may be used to predict and mitigate cyberattacks utilizing cutting edge exploits according to various embodiments of the invention. Through functions of business operating system 100, a plurality of sources are continually monitored for new developments in hacking tools, exploits, and vulnerabilities. Information gathering steps may include, but is not limited to, gathering information from the deep and dark web in step 405, gathering information regarding publicly available vulnerabilities discovered and disclosed on the common internet 408, gathering historical data gathered from previous cyberattacks, both attempts and successful breaches, in step 411, and gathering of published opinions from security experts in step 413. The data may then be analyzed by the business operating system using models and simulations in step 414 to accurately predict emerging trends, and developments of cyberattacks. The result of the data analysis allows the insurance provider to not only provide up-to-date system protection to the prospective client's systems in step 417, but may also provide safeguards from exploits that may still be in early stages of development. Additionally, by continuously monitoring the client's network and baseline network usage, anomalies in network usage may provide an additional source of data to aid in the prediction and mitigation of a cyberattack.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 5:
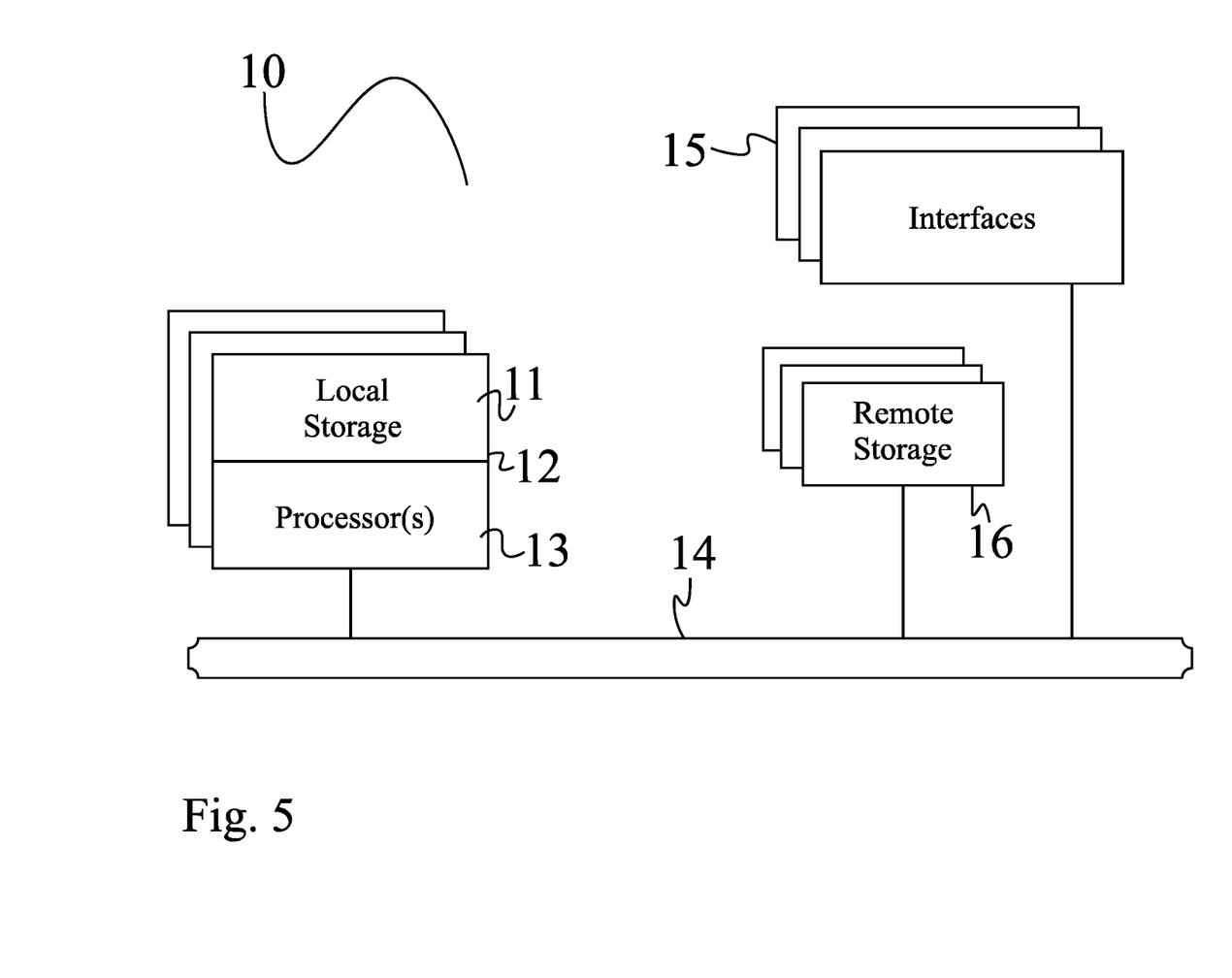
FIG. 5 is a block diagram illustrating an exemplary hardware architecture of a computing device used in various embodiments of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 5 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
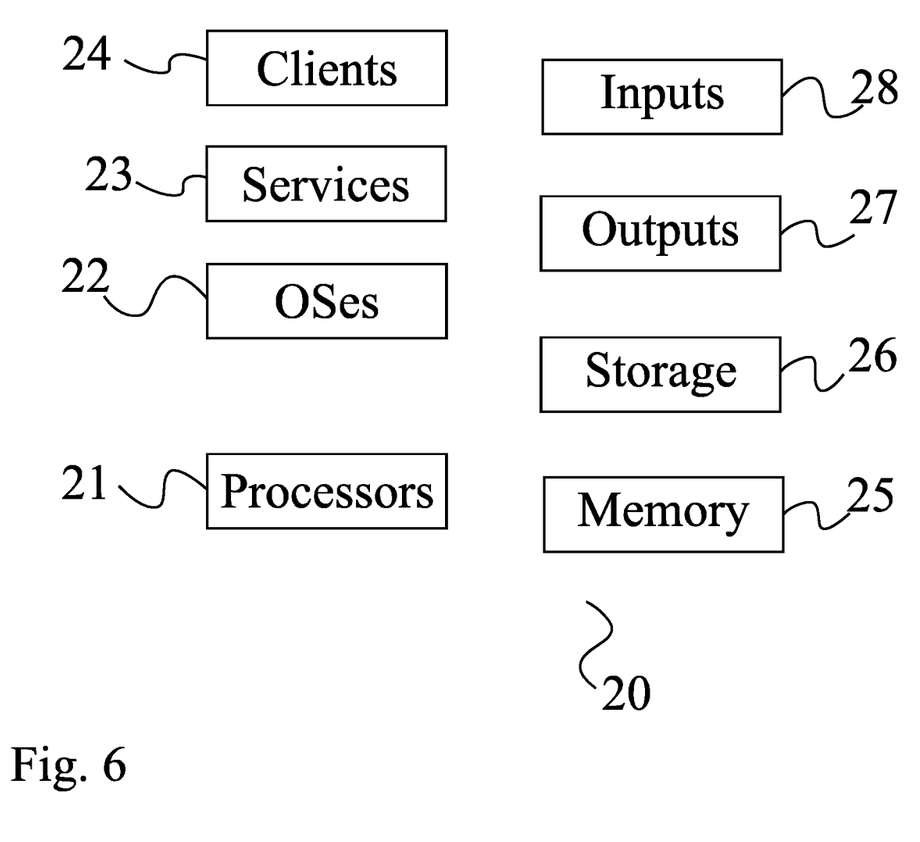
FIG. 6 is a block diagram illustrating an exemplary logical architecture for a client device, according to various embodiments of the invention.

In some aspects, systems may be implemented on a standalone computing system. Referring now to FIG. 6, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
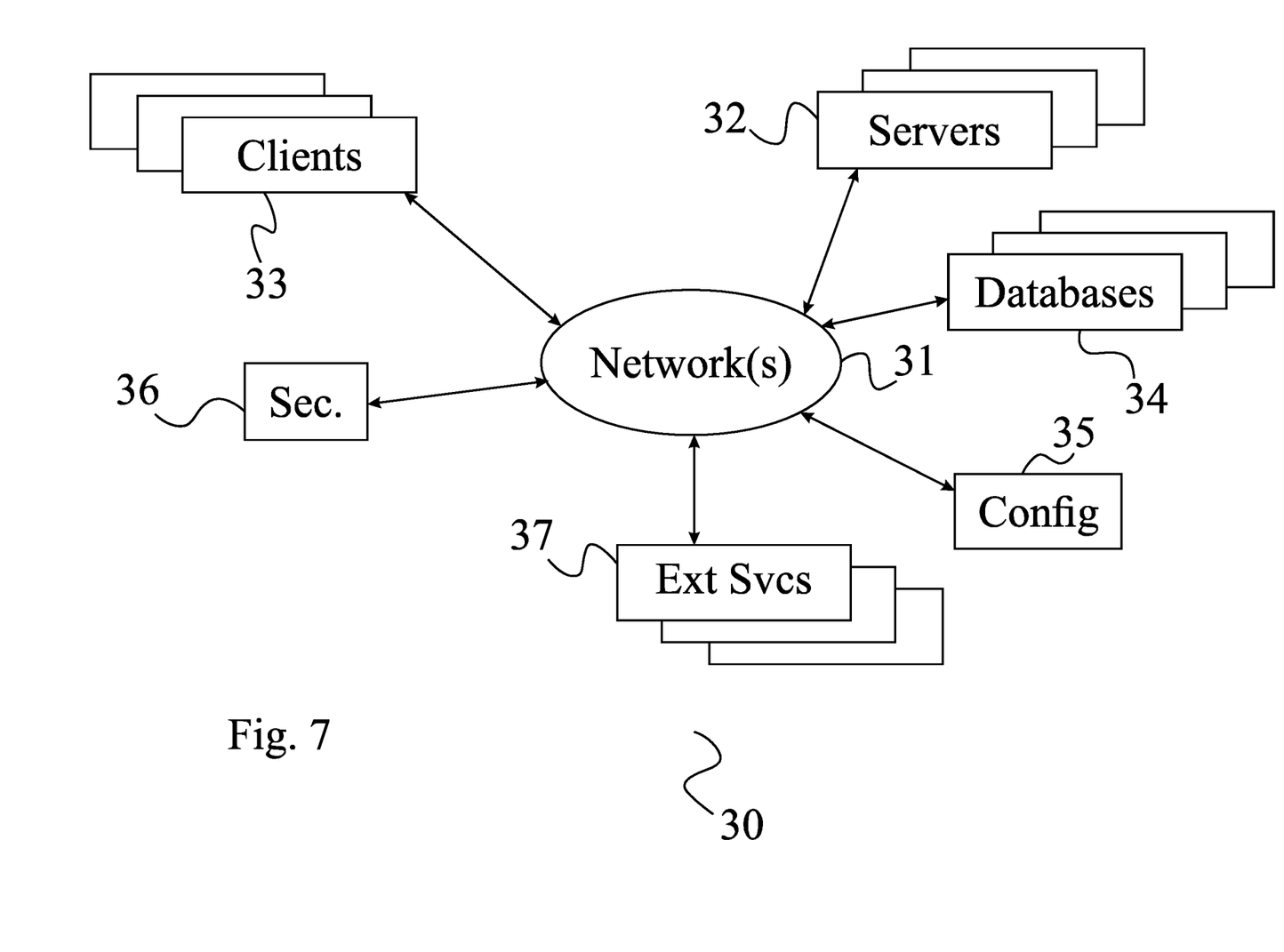
FIG. 7 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 8:
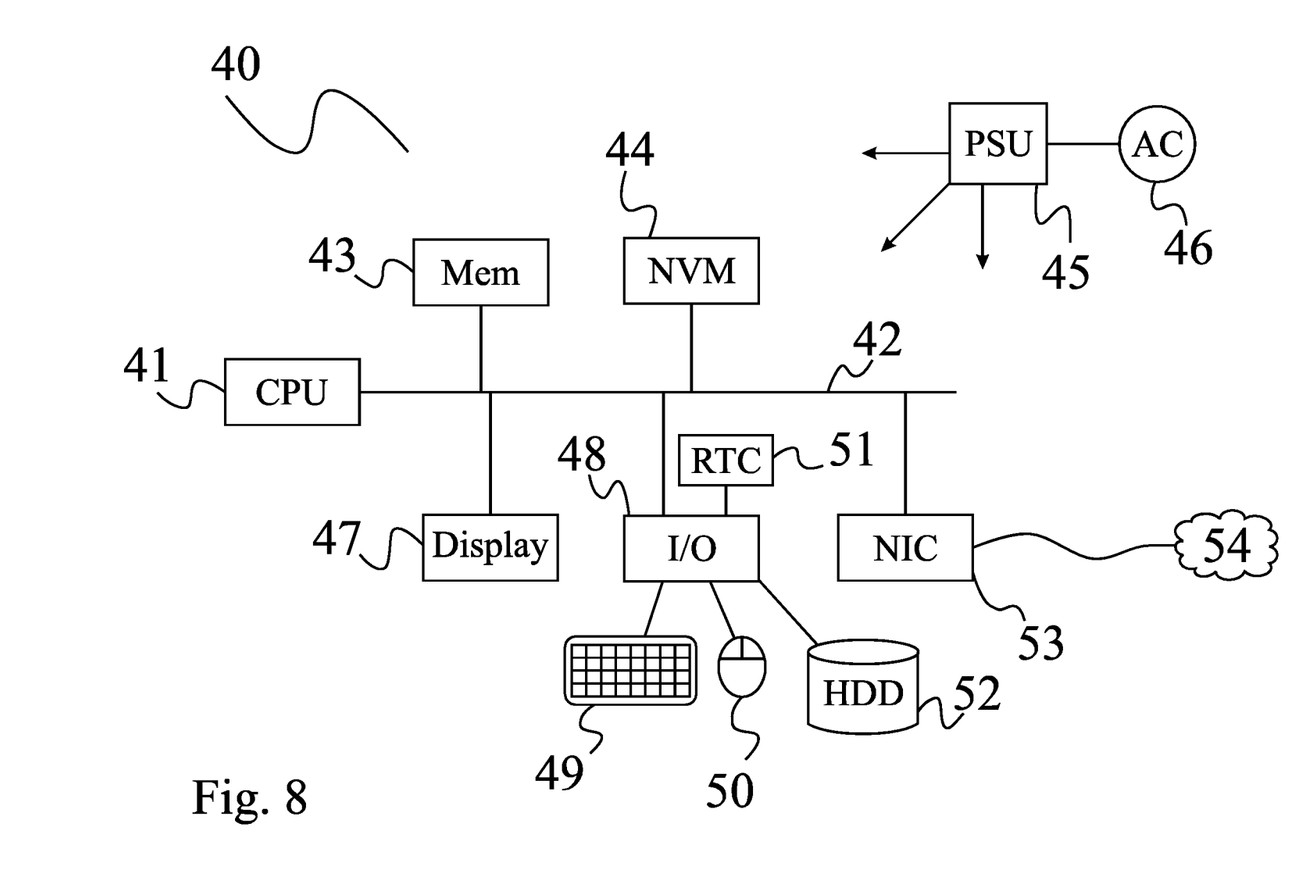
FIG. 8 is another block diagram illustrating an exemplary hardware architecture of a computer device used in various embodiments of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for generating a cybersecurity profile for cyber insurance risk analysis, comprising:
 a network-connected server comprising a memory, a processor, and a non-volatile storage device;
 a web portal comprising a first plurality of programming instructions stored in the memory and operating on the processor which causes the network-connected server to:
  install and execute a software snapshot script on the client computer, the software snapshot script comprising a second plurality of programming instructions operating on the client computer which cause the client computer to:
   identify a network of computers to which the client computer is attached;
   determine a baseline network usage of the network of computers;
   identify publicly facing computers in the network of computers;
   identify software and services running on the network of computers; and
   store client network data on the non-volatile storage device, the client network data comprising the identified network of computers, the baseline network usage, the publicly facing computers, and the identified software and services;
 a high volume web crawler comprising a third plurality of programming instructions stored in the memory and operating on the processor which cause the network-connected server to:
  retrieve the client network data from the non-volatile storage device; and
  search the Internet for current trends in exploits and cyberattack targets related to the industry and the client network data;
 a directed computational graph analysis module comprising a fourth plurality of programming instructions stored in the memory and operating on the processor which cause the network-connected server to:
  retrieve the client network data and the search results from the non-volatile storage device; and
  construct a propensity-to-be-attacked profile from the client network data and the search results, the propensity-to-be-attacked profile comprising a directed computational graph comprising nodes representing data transformations and edges representing messages between the nodes; and
 an automated planning service module comprising a fifth plurality of programming instructions stored in the memory and operating on the processor which cause the network-connected server to:
  analyze the propensity-to-be-attacked profile by performing one or more analyses on the directed computational graph to determine a likelihood of various cyberattack occurrences; and
  assign a threat profile based on the likelihood of various cyberattack occurrences.

2. The system of claim 1, wherein information provided by the client comprises systems configurations, system layout, and digital assets.

3. The system of claim 1, wherein the directed computational graph further comprises data previously gathered and previously analyzed from other clients and stored in the non-volatile storage device.

4. The system of claim 1, wherein the high volume web crawler continuously monitors the Internet for release and development of new cybersecurity threats.

5. The system of claim 1, wherein the search results are used to protect a client's systems from new and unknown threats.

6. A method for generating a cybersecurity profile, comprising the steps of:
- installing and executing a software snapshot script on a client computer, the software snapshot script comprising a plurality of programming instructions capable of operating on the client computer to cause the client computer to:
  - identify a network of computers to which the client computer is attached;
  - determine a baseline network usage of the network of computers;
  - identify publicly facing computers in the network of computers;
  - identify software and services running on the network of computers; and
  - store client network data on a non-volatile storage device, the client network data comprising the identified network of computers, the baseline network usage, the publicly facing computers, and the identified software and services;
- constructing a propensity-to-be-attacked profile from the client network data and the search results, the propensity-to-be-attacked profile comprising a directed computational graph comprising nodes representing data transformations and edges representing messages between the nodes;
- analyzing the propensity-to-be-attacked profile by performing one or more analyses on the directed computational graph to determine a likelihood of various incident occurrences; and
- assigning a threat profile based on the likelihood of various cyberattack occurrences.

7. The method of claim 6, wherein information provided by the client comprises systems configurations, system layout, and digital assets.

8. The method of claim 6, wherein the directed computational graph further comprises data previously gathered and previously analyzed from other clients and stored in the non-volatile storage device.

9. The method of claim 6, further comprising the step of using a high volume web crawler to continuously monitor the Internet for release and development of new cybersecurity threats.

10. The method of claim 6, further comprising the step of using the search results to protect a client's systems from new and unknown threats.

* * * * *